April 14, 1936.    B. L. ROBART ET AL    2,037,179
PILOT CONTROL REDUCING VALVE
Filed Nov. 3, 1932    2 Sheets-Sheet 1

Inventors
Braxton L. Robart
and
Earl P. Buell
by  Townsend F. Beaman
Attorney

Patented Apr. 14, 1936

2,037,179

UNITED STATES PATENT OFFICE 2,037,179

PILOT CONTROL REDUCING VALVE

Braxton L. Robart and Earl P. Buell, Jackson, Mich., assignors to The Robuell Company, a corporation Application November 3, 1932, Serial No. 641,017

8 Claims. (Cl. 50—11)

The present invention relates to an improvement in pressure regulating valves for reducing and automatically controlling the service pressure at the outlet of the valve, which is capable of maintaining substantially a constant service pressure regardless of variation in line pressure and demands of the working load.

A further object of this invention is to provide a pressure regulator which is under the full control of the service pressure; the service pressure controlling the opening of the valve by high pressure through the medium of a pilot valve and closing the valve directly.

Another object of our invention is to provide a pressure regulating valve of the piston type which is completely balanced transversely and is capable of effecting a two stage reduction in pressure thus substantially reducing wire drawing.

A still further object of this invention is to provide a pressure regulator which is decidedly more compact in structure than devices of the same type herebefore developed and which may be economically fabricated in view of the fact that the parts requiring machining have been reduced to a minimum.

Another object of this invention is to provide a straight line piston type of pressure regulating valve.

Another object is to eliminate the necessity for the employment of diaphragms and to provide a mechanism upon which repair and replacement may be readily made without the removement of the valve housing from the line.

These and other objects and advantages will appear as the description proceeds. It is to be distinctly understood, however, that we do not desire to be limited to the exact details made with reference to the several preferred forms of our invention herein described, but intend to include as part of our invention all such changes and modifications which would occur to those skilled in the art and fall within the scope of the appended claims.

In the following paragraphs, reference is made to steam as the regulated pressure medium in order to facilitate the description. Obviously, our invention has equal application to other fluids under pressure and for this reason any mention of steam is intended to also include other fluids.

Figure 1:
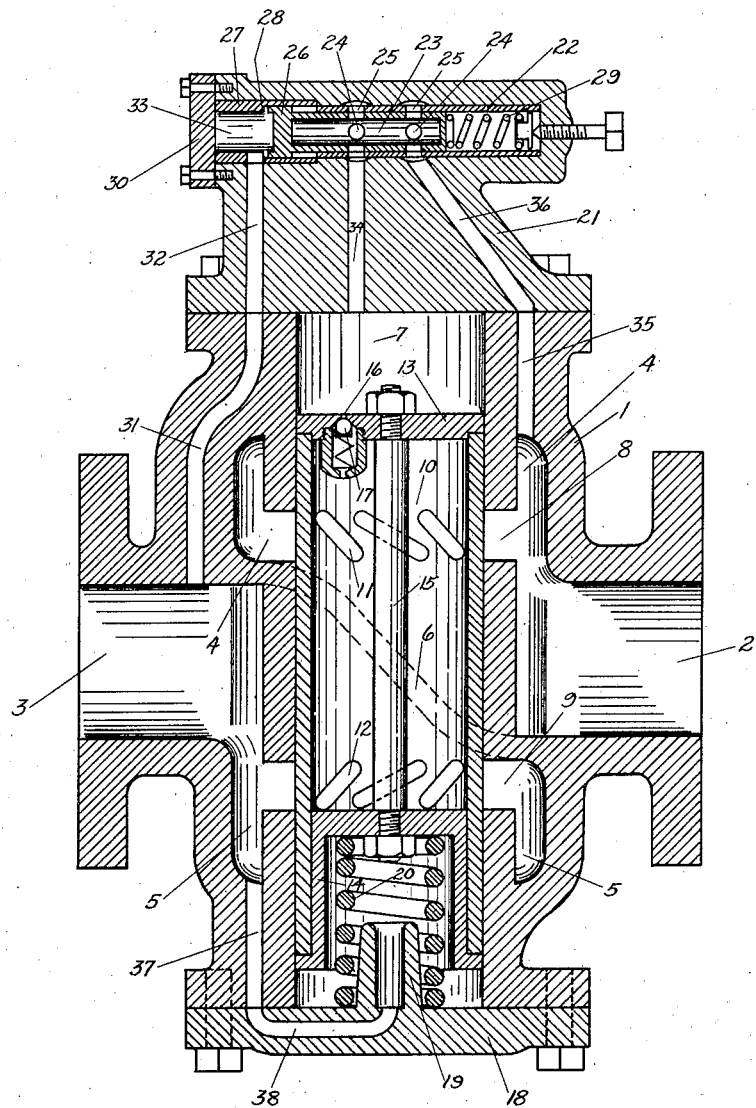

In the accompanying drawings wherein two forms which our invention may take are disclosed for the purpose of illustration, Fig. 1 is a cross sectional view of one form of our valve mechanism in which the inlet and outlet are presented in straight line relationship.

Figure 2:
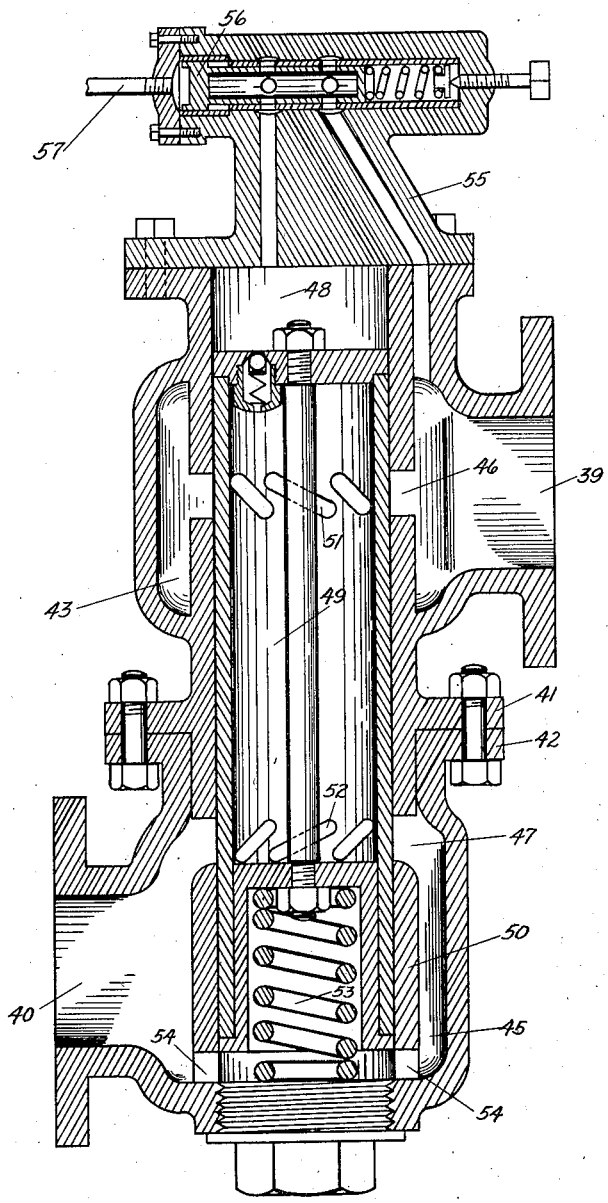

Fig. 2 is a cross sectional view of a modified form of our valve mechanism in which the inlet and outlet are presented in offset relationship.

Having reference to the drawings, in Fig. 1 a valve housing 1 is provided with flanged inlet and outlet openings 2—3, respectively. The openings 2—3 communicate with jackets 4—5, respectively, located above and below the center line of the openings 2—3. A web 6 separates the jackets 4—5 into two distinct compartments between which communication is effected by a piston valve as to be hereinafter described.

A cylinder 7 extends longitudinally of the housing 1 having ports 8—9 in the form of annular slots providing communication between the cylinder 7 and the jackets 4—5. A piston valve 10 is slidably received in the cylinder 7. This piston is provided with ports 11—12 spaced longitudinally thereof a distance equal to the spacing of the ports 8—9 in the cylinder 7. The ports 11—12 are preferably slanted in order to provide a maximum port opening with a minimum valve travel.

The piston 10 is capped at both ends by members 13—14 retained in position by a brace rod 15. In order to provide for the removal of condensation above the piston 10, a small port 16 is provided in the cap 13. This port is normally closed by a spring stressed ball valve 17, but is opened by a predetermined differential pressure to discharge the trapped condensation.

The lower end of the housing 1 is provided with a removable plate 18 to permit the insertion and removal of the piston 10. In our preferred form, a spring guide 19 is cast integral with the plate 18. A spring 20 is inserted over the guide 19 which functions to support the piston in the position shown and to cushion any sudden downward travel of the same.

A pilot valve housing 21 is secured to the upper ends of the housing 1 and seals the upper end of the cylinder 7. The housing 21 is provided with a horizontal recess in which a tubular sleeve 22 is received constituting a cylinder. A hollow piston valve 23 is slidably arranged within the sleeve 22 having series of spaced ports 24 adapted to communicate with a series of similarly spaced ports 25 located in the sleeve 22. The left hand end of the piston 23 is provided with an enlarged diameter 26. As illustrated, the sleeve 27 receiving the enlarged portion 26 of the piston 23 is provided with a shoulder 28 to limit the movement of the piston to the left. An adjustable spring 29 bears against one end of the piston 23 and urges the same against the shoulder 28. A removable end plate 30 permits ready access to the pilot valve mechanism.

The housing 1 is channeled at 31 to conduct service or low pressure through channels 32 in the housing 21 into the chamber 33 wherein the pressure is directed against the left end of the piston 23. A channel 34 opens into the cylinder 7 at one end and into an annular groove at the other end adjacent the ports 25 in the sleeve 22 to function as a conduit for pressure directed against the top of the piston 10 as will be hereinafter described. Communicating channels 35—36 open into the high pressure side of the valve at the lower end and into an annular groove adjacent the ports 25 in a manner similar to the channel 34. Additional communicating channels 37—38 open into the service or low pressure side of the valve at one end and into a chamber below the lower capped end of the piston 10 at the other end.

The operation of the above described mechanism follows: With the piston 10 supported upon the spring 20 in the position shown, steam under high pressure is admitted through the inlet 2, flowing into the jacket 4 to completely balance the piston 10 transversely, and through the communicating ports 8—11 into the interior of the piston 10. In passing through the ports 8—11, the first stage of pressure reduction is effected. The steam admitted through the ports 8—11 flows downward through the interior of the piston 10 and out through communicating ports 9—12 into the jacket 5, where the piston is again completely balanced transversely, and finally into the service or low pressure outlet 3. In passing through the ports 9—12 into the jacket 5, the second stage of pressure reduction is effected.

In order to prevent the building up of pressure on the service side of the valve when the working load is removed or reduced and to effect substantially a constant service pressure independent of the variation in the high pressure and demands of the working load, the service pressure is by-passed to automatically control the movement of the piston 10. In the position shown, the spring 29 is holding the piston 23 to the left to provide communication between the ports 25 located in the sleeve 22 and ports 24 located in the piston 23. With the piston 23 in this position, high pressure steam passes through the channels 35—36, circumscribe the piston 23 by passing into annular grooves adjacent the ports 25, through the communicating ports 24—25 into the interior of the piston 23, out through the communicating ports 24—25 at the left end of the piston and into the annular groove communicating with channel 34 through which the high pressure steam is directed against the top of the piston 10 to retain the same in the position shown. Upon the initial admission of high pressure through the valve or upon the opening of the ports 8 subsequent to the closing of the same by the service pressure, as will be described, the differential pressure above and below the cap 13 is sufficient to overcome the tension of the spring holding the valve 17 to a seat, momentarily, to discharge the condensation above the cap 13 into the interior of the piston 10.

Upon the building up of the service pressure in the outlet 3 to a predetermined point, this pressure being conducted through the channels 31—32 is directed against the left end of the piston 23, moving the piston 23 to the right against the tension of the spring 29. Movement of the piston 23 to the right closes the ports 24 interrupting the admission of high pressure steam against the top of the piston 10. The length of travel of the piston 23 necessary to effect complete closing of the ports 24 is preferably very slight in order that the pilot valve be sensitive to slight variations in service pressure.

With the admission of high pressure against the top of the piston 10 interrupted, the service pressure admitted through the channel 37—38 against the lower end of the piston 10 is able to raise the same to restrict the ports 11—12 sufficiently to maintain the predetermined service pressure in the outlet 3. During normal operation the pressure above and below the piston 10 will position the same to provide the proper restriction of the ports 11—12 to effect the predetermined service pressure.

Instead of employing the spring 20 merely as a support for the piston and utilizing the service pressure to close the valve, the channels 37—38 may be omitted and the spring 20 designed to urge the closing of the valve. However, in our preferred form we found it advantageous to depend solely upon differential fluid pressure to move the piston 10 in both directions.

As will be readily apparent, a sudden variation in the service pressure, completely closing the ports 24, will not result in a sudden movement of the piston upwardly to the possible damage of the piston or the housing 21. The pressure above the piston is gradually dissipated and the space in the cylinder above the piston 10 acts as a dash pot to effect a smooth gradually raising of the piston by the service pressure.

In Fig. 2 is shown a modified form of our invention in which the inlet 39 and the outlet 40 are located in offset relation relative to each other. As illustrated the casting constituting the inlet and outlet 39—40 are provided with flanges 41—42, respectively, bolted or otherwise removably secured together, which enables the angularity of the inlet and outlet to be adjusted in parallel planes. Jackets 43—44, communicating with the inlet and outlet 39—40, have ports 46—47 in the form of annular slots located in the walls of a vertical cylinder 48. A piston 49, which may be identical in construction with the piston 10 is slidably guided in the cylinder 48 and the sleeve 50, constituting an extension of the cylinder 48. Ports 51—52 in the piston 49 cooperate with the ports 46—47 in the same manner as the ports 8—9 cooperate with the ports 11—12 of Fig. 1. The spring 53 functions as the spring 20. Ports 54 are provided in the sleeve 50 to admit the service pressure to raise the piston 49.

A pilot valve housing 55 is removably secured to the upper portion of the valve housing. The by-pass from the high pressure inlet to the chamber above the top of the piston 49 and the mechanism for regulating the by-pass are identical with those disclosed with reference to Fig. 1 with the single exception that the low or service pressure is directed against the left end of the piston through an external conduit 57 extending from the service side of the system.

The operation of the valve shown in Fig. 2 is identical with that herebefore described with reference to Fig. 1.

Having thus described our invention, what we claim as new and desire to protect by Letters Patent is:

1. A fluid pressure regulator comprising a body portion having a cylindrical chamber, high and low pressure chambers, a hollow piston valve closed at both ends slidably disposed in said first chamber, restricted ports spaced longitudinally of said piston, ports in said high and low pressure chambers communicating with said piston ports in one position, means under the control of the low pressure for directing high pressure against one end of said piston to move the same in one direction, and means for directing the low pressure against the other end of the piston to move the same in the opposite direction.

2. A fluid pressure regulator comprising a body portion, high and low pressure chambers defined in said body, a vertical chamber, a transversely balanced hollow piston valve movable in said vertical chamber, communicating ports located in said valve and pressure chambers, a pilot valve housing closing one end of said vertical chamber operated by fluid from said low pressure chamber, a transversely balanced valve in said housing supported for horizontal movement, communicating channels regulated by said second valve for directing high pressure against one end of said first piston valve to move the same to one regulating position, and continuously open means for directing fluid pressure against the other end of said first piston to move the same to another regulating position.

3. A fluid pressure regulator comprising a body portion, high and low pressure chambers defined in said body, a vertical chamber, a transversely balanced hollow piston valve movable in said vertical chamber, communicating ports located in said valve and pressure chambers, a pilot valve housing closing one end of said vertical chamber operated by fluid from said low pressure chamber, a transversely balanced valve in said housing supported for horizontal movement, communicating channels regulated by said second valve for directing high pressure against one end of said first piston valve to move the same to one regulating position, and continuously open means acting against the other end of said first piston to move the same to another regulating position.

4. A fluid pressure regulator comprising a body portion, high and low pressure chambers defined in said body, a vertical chamber, a transversely balanced piston valve slidably disposed in said vertical chamber, communicating ports located in said valve and pressure chambers, a pilot valve housing closing one end of said vertical chamber, a transversely balanced pilot valve located in said housing, communicating channels for directing low pressure against both of said valves to move the same in one direction, communicating channels for directing high pressure against the piston valve to move the same in the opposite direction, the communication of said last channels being regulated by said pilot valve, and a regulable spring for urging said pilot valve in a direction opposing the low pressure.

5. A fluid pressure regulator comprising a body portion, a vertical chamber extending through said body, high and low pressure chambers communicating through said vertical chamber, a piston valve slidably disposed in said vertical chamber interrupting the communication between said pressure chambers, a removable cap closing one end of said vertical chamber, a channel in said body opening into said low pressure chamber directing low pressure against one end of said piston to raise the same, a pilot valve housing closing the other end of said vertical chamber, a hollow piston valve having spaced ports slidably supported in said housing for horizontal movement, communicating channels in said body and housing opening into said low pressure chamber directing low pressure against one end of said hollow piston to move the same in one direction, communicating channels in said body and housing opening into said high pressure chamber directing high pressure against the other end of said first valve to lower the same, the communication of said last channels being interrupted by said hollow piston in one position and established through the ports in said hollow piston in another position, and a regulable spring for moving said hollow piston in the opposite direction against the low pressure.

6. A fluid pressure regulator comprising a body portion having a cylindrical chamber, high and low pressure chambers, a hollow piston valve closed at both ends slidably disposed in said first chamber, restricted ports spaced longitudinally of said piston, ports in said high and low pressure chamber communicating with said piston ports in one position, means including a piston valve under control of the low pressure for directing high pressure against one end of said piston to move the same in one direction, and means for directing the low pressure against the other end of the piston to move the same in the opposite direction.

7. A fluid pressure regulator comprising a body portion having a cylindrical chamber, high and low pressure chambers, a hollow piston valve closed at both ends slidably disposed in said first chamber, a series of circumferentially arranged restricted ports in said piston, a second series of circumferentially arranged restricted ports in said piston and spaced longitudinally from said first series, ports in said high and low pressure chambers communicating with said piston ports in one position, means under control of the low pressure for directing high pressure against one end of said piston to move the same in one direction and means for directing the low pressure against the other end of said piston to move the same in the opposite direction.

8. A fluid pressure regulator comprising a body portion, a cylindrical chamber, the wall of said chamber being divided into upper, intermediate, and lower sections, longitudinally spaced ports defined by and between said sections, upper and lower annular chambers collectively jacketing substantially said entire intermediate section and extending above and below said ports to jacket substantial portions of said upper and lower sections, an angularly disposed wall separating said annular chambers and encircling said intermediate section, said angularly disposed wall extending from below one side of said intermediate section to above the other side of said intermediate section, substantially aligned inlet and outlet openings communicating with said upper and lower jacketing chambers and separated by said wall, said ports opening into said jacketing chambers, a cylindrical hollow piston pressure reducing valve slidably supported within said cylindrical chamber and snugly guided throughout its length by said sections, said valve having a plurality of longitudinally spaced ports respectively communicating with said annular ports in one position of the valve for regulating the flow of fluid through the regulator.

BRAXTON L. ROBART.
EARL P. BUELL.